Feb. 3, 1942.  M. A. WECKERLY  2,272,141
WEIGHING SCALES
Filed Aug. 25, 1939
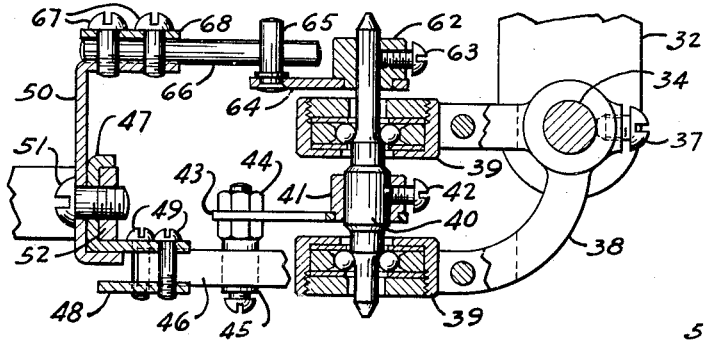
Fig. III
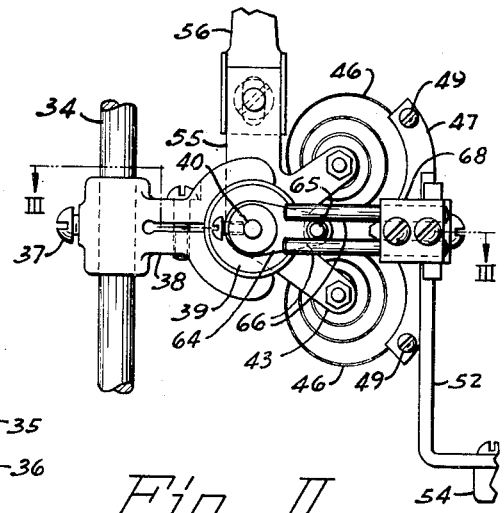
Fig. II
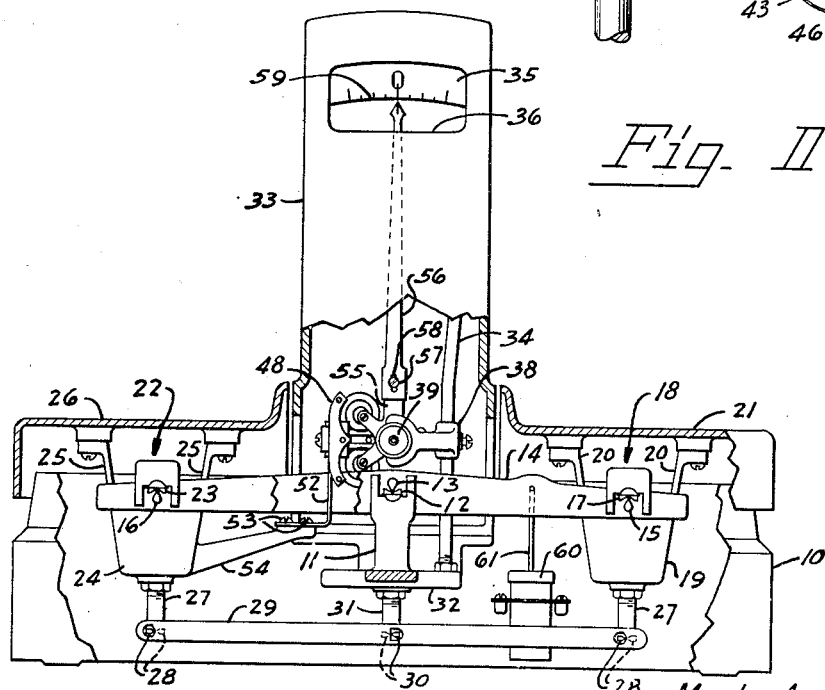
Fig. I
Mark A. Weckerly
INVENTOR
BY Marshall & Marshall
ATTORNEYS Patented Feb. 3, 1942

2,272,141

UNITED STATES PATENT OFFICE 2,272,141

WEIGHING SCALES

Mark A. Weckerly, Toledo, Ohio, assignor to Toledo Scale Company, a corporation of New Jersey Application August 25, 1939, Serial No. 291,841

6 Claims. (Cl. 265—58)

This invention relates generally to weighing scales, and more particularly to weighing scales in which an indicator is actuated by counterbalancing springs.

The principal object of this invention is the provision of improved means for preventing undesired indicator vibrations or oscillations.

Another object is the provision of means connected to the indicator driving member and to the indicator which permit normal rotation of the indicator but prevent unwanted oscillations.

These, and other objects and advantages will be apparent from the following description in which reference is had to the accompanying drawing, illustrating a preferred embodiment of the invention and wherein similar reference numerals refer to similar parts throughout the several views.

Referring to the drawing:

Fig. I is a front elevational view of a scale embodying the invention, parts being broken away.

Fig. II is an enlarged fragmentary rear elevational view of that portion of the scale embodying the invention; and, Fig. III is a section therethrough substantially along the line III—III of Fig. II.

Referring to the drawing in detail:

The scale in which the device is shown embodied comprises a base or principal frame 10 which is in the form of a rectangular shell having an inwardly inclined upper edge. Secured to bosses formed on the interior of the shell 10 is a bracket 11 provided with sockets in which bearings 12 are mounted. Supported on these bearings are fulcrum pivots 13 fixedly secured in an even-armed lever 14. Also fixedly secured to the even-armed lever 14 are a pair of commodity supporting pivots 15 and 16. The pivot 15 engages a bearing 17 seated in an inverted socket in a load platter supporting spider 18. The commodity platter supporting spider 18 is formed with a loading box 19 and with upwardly extending arms 20 to the upper ends of which is screwed a commodity platter 21. The pivot 16 supports a counterpoise platter spider 22 which rests thereon by means of bearings 23. This spider is also provided with a loading box 24 and arms 25 to which is fastened a counterpoise platter 26. Skirts on these platters overlap the inwardly bent upper edge of the base 10 and prevent the ingress of dirt.

Check link posts 27, which are adjustably studded in the bottom of the spiders 22 and 18, have opposed pivots 28 riveted thereto and these pivots engage bearings in the ends of a check link 29. Bearings provided midway between the end bearings engage opposed pivots 30 riveted to the end of a stud 31 dependingly projecting from the bracket 11. Screwed into a shelf 32 of the bracket 11 and projecting upwardly into a housing 33, which is fastened to the base 10, is a post 34 supporting on its upper end a chart 35 which is visible through an opening 36. Clamped, by means of a screw 37, to the post 34 is a two-armed bracket 38 and in the ends of each of these arms is clamped a ball bearing assembly 39. These bearings support the ends of a shaft 40. Secured to a collar 41, which is fastened to the shaft by means of a screw 42, is a forked member 43. Secured to the end of each of the forks of this member 43, by means of a nut 44, is a short stud 45 retaining the inner end of a spiral spring 46 whose outer ends are clamped between a formed angle bracket 47 and a plate 48 by means of screws 49. The formed bracket 47 and a substantially U-shaped bracket 50 are clamped, by means of a screw 51, to the upper end of a metallic angle 52, the lower arm of which is fastened, by means of screws 53, to the upper face of an arm 54 extending laterally from the loading box 24 of the counterpoise platter spider 22. An upwardly extending arm 55 integral with the forked member 43 forms a support for an indicator 56 which is adjustably clamped thereto by means of a screw 57 passing through an elongated hole 58. This indicator extends upwardly within the housing 33 and cooperates with indicia 59 on the chart 35 to indicate quantitatively the condition of balance of a load on the load platter 21 and a counterpoise on the platter 26.

For damping the vibrations of the lever 14 and the mechanism directly connected thereto a dashpot 60 is provided whose plunger (not shown) is connected by means of a rod 61 to the lever 14 in a known manner.

When an unknown load is placed upon the platter 21 for comparison with a known weight or counterpoise on the platter 26, if the load is greater than the counterpoise the lever will rock in a clockwise direction and the angular member 52 since it partakes of the motion of the counterpoise platter, due to its connection, moves upwardly and thus through the members 47 and 48 exerts an upward thrust against the spiral springs 46, one of which unwinds slightly and the other slightly winds up, counterbalancing the unbalanced portion of the load but at the same time since the outer ends are displaced and their equilibrium disturbed they rock the forked member 43 about its fulcrum in the bearings 39 and the indicator 56 indicates on the chart 35 the amount of unbalance.

The construction so far described is well adapted to determine and indicate the weight of a load but since the indicator is actuated through the spiral springs 46 there is a tendency for this indicator to vibrate when the load, or the counterpoise is applied with a shock since these springs are elastic and have a natural period of vibration. To prevent these unwanted vibrations a collar 62 is clamped, by means of a screw 63, to the end of the shaft 40 which extends beyond the bearing 39 in the rear arm of the bracket 38. A stamped arm 64 which is ringstaked to this collar, has riveted near its end a stud 65 which is made of polished drill rod and which extends laterally between two pins 66 also made from polished drill rod and clamped by means of screws 67 and clip 68 to one of the webs of the substantially U-shaped bracket 50 which is clamped to the angle 52. The distance between the pins 66 is such that the stud 65 may just pass therebetween without friction but also without excessive lost motion. Since the two pins 66, which in effect form a slot for the stud 65, are fastened to the same member to which the ends of the springs 46 are fastened their movement is identical with that of the spring ends and any oscillation of the indicator independent of its rocking movement due to the unbalanced portion of the load is effectively prevented since the stud 65 is fixedly secured to the indicator shaft.

The forked member 43 and the arm 64, ringstaked to the collars 41 and 62 which are fastened by setscrews to the shaft 40, together with integral arm 55 of the forked member 43 and the indicator 56 clamped to the arm 55, form a rigid indicator assembly which is acted upon by the unique indicator driving means and vibration preventing means of this invention.

As the platter spider 22 moves up and down under the influence of the weight of a load the springs 46 are flexed and their resistance to flexion constitutes the load counterbalance.

The springs also act to turn the indicator shaft 40 and swing the indicator 56 over the chart 35. This turning movement of the indicator shaft is permitted and controlled by the vertical movement of the pins 66, which move upwardly and downwardly in response to the same movement of the platter spider 22 which acts through the springs to swing the indicator hand over the chart. Independent jiggling of the indicator hand, which the springs, because of their flexibility, would not prevent, is prevented by the pins 66. Hence, the indicator hand can partake only of the movement resulting from the application and removal of loads to and from the scale platters.

The embodiment of the invention herein shown and described is to be regarded as illustrative only, and it is to be understood that the invention is susceptible to variation, modification and change within the spirit and scope of the subjoined claims.

Having described the invention, I claim:

1. In a device of the class described, in combination, a rockingly mounted even-armed lever, a load receiver mounted on each end of said lever, an indicator assembly rockingly mounted independently of said lever to rock on an axis parallel to the rocking axis of said lever, a plurality of load counterbalancing springs, each of said springs having one of its ends secured to said indicator assembly and the other of its ends operatively connected to an end of said lever, said springs serving to counterbalance a load on one of said load receivers, means forming a slot connected to one of the ends of said lever and a pin secured to said indicator assembly for engaging said means forming such slot.

2. In a device of the class described, in combination, an oscillating load receiving mechanism, an independently mounted indicator assembly, a pair of opposed spiral load counterbalancing springs each having one of its ends secured to said indicator assembly and the other of its ends secured to said load receiving mechanism, means secured to said indicator assembly and to said load receiving mechanism respectively and adapted to engage each other to prevent oscillations of said load counterbalancing springs and said indicator assembly of a greater frequency than such oscillations of said load receiving mechanism, said means secured to said indicator assembly comprising a single pin and said means secured to said load receiving means comprising a pair of pins, said pins being mounted so that one of said pair of pins engages said pin on said indicator assembly on one side and the other of said pair of pins engages said pin on said indicator on its opposite side.

3. In a device of the class described, in combination, a rockingly mounted even-armed lever, a load receiver mounted on each end of said lever, an indicator assembly mounted independently of and above the plane of said lever, a platter spider pivotally mounted upon one end of said lever, an angular member secured to said platter spider having one of its arms extending upwardly and adjacent said indicator assembly, a pair of spaced spiral counterbalancing springs secured to said indicator assembly and to said upwardly extending arm of said member secured to said spider, means forming a slot secured to said member and means secured to said indicator assembly extending into such slot.

4. In a device of the class described, in combination, load receiving mechanism, an independently mounted indicator assembly, a member secured to said load receiving mechanism, a spring, said spring having one of its ends connected to said independently mounted indicator assembly and its other end to said member connected to said load receiving mechanism, a pair of pins secured to said member and extending horizontally and in spaced relation to each other, an arm secured to said indicator assembly and a pin extending horizontally from said arm between said pair of pins clamped to said member.

5. In a device of the class described, in combination, a load receiving mechanism, a load indicating assembly, load counterbalancing means comprising a pair of opposed springs, each of said springs having one end connected to said load indicating assembly and its other end to said load receiving mechanism, said springs serving to offset loads on said load receiving mechanism and other means extending between said load indicating assembly and said load receiving mechanism for preventing movements of said load indicating assembly independent of those imparted to it by loading of said load receiving mechanism.

60. In a device of the class described, in combination, load receiving mechanism, an independently mounted indicator assembly, a pair of opposed spiral load counterbalancing springs each having one of its ends secured to said indicator assembly and the other of its ends secured to said load receiving mechanism, and means secured to said indicator assembly and to said load receiving means respectively and adapted to engage each other to prevent independent oscillating vibrations of said load counterbalancing springs and said indicator assembly.

MARK A. WECKERLY.